United States Patent
De Kock

(10) Patent No.: US 9,856,940 B2
(45) Date of Patent: Jan. 2, 2018

(54) FLUID-FILLED, FREQUENCY-DEPENDENT DAMPER

(71) Applicant: KONI B.V., Oud Beijerland (NL)

(72) Inventor: Paul De Kock, Numansdorp (NL)

(73) Assignee: KONI B.V., Oud Beijerland (NL)

( * ) Notice: Subject to any disclaimer, the term of this patent is extended or adjusted under 35 U.S.C. 154(b) by 0 days.

(21) Appl. No.: 14/349,662

(22) PCT Filed: Oct. 3, 2012

(86) PCT No.: PCT/NL2012/050692
§ 371 (c)(1),
(2) Date: Apr. 4, 2014

(87) PCT Pub. No.: WO2013/051934
PCT Pub. Date: Apr. 11, 2013

(65) Prior Publication Data
US 2014/0238798 A1   Aug. 28, 2014

(30) Foreign Application Priority Data
Oct. 4, 2011 (NL) .................................. 2007530

(51) Int. Cl.
| F16F 9/34 | (2006.01) |
| F16F 9/512 | (2006.01) |
| F16F 9/46 | (2006.01) |
| F16F 9/516 | (2006.01) |

(52) U.S. Cl.
CPC ............ *F16F 9/5126* (2013.01); *F16F 9/465* (2013.01); *F16F 9/516* (2013.01)

(58) Field of Classification Search
CPC .......... F16F 9/465; F16F 9/5126; F16F 9/516; B60G 17/0528

USPC ............ 188/282.1, 282.6, 313, 315, 322.22, 188/322.15, 22.22
See application file for complete search history.

(56) References Cited

U.S. PATENT DOCUMENTS

| 5,129,488 | A | * | 7/1992 | Furuya et al. ............. 188/282.6 |
| 5,248,014 | A | * | 9/1993 | Ashiba ........................ 188/282.8 |
| 5,386,892 | A | * | 2/1995 | Ashiba ........................ 188/282.8 |
| 5,409,090 | A | * | 4/1995 | Kashiwagi et al. ....... 188/282.1 |
| 5,823,305 | A |   | 10/1998 | Richardson et al. |

(Continued)

FOREIGN PATENT DOCUMENTS

| CN | 1177394 | 3/1998 |
| CN | 1871452 | 11/2006 |

(Continued)

OTHER PUBLICATIONS

International Search Report, dated Dec. 6, 2012, from corresponding PCT application.

(Continued)

*Primary Examiner* — Christopher Schwartz
(74) *Attorney, Agent, or Firm* — Young & Thompson

(57) ABSTRACT

A fluid-filled, frequency-dependent damper includes a cylinder connected to a cylinder attachment portion; a piston connected to a piston attachment portion, the piston being displaceable in the cylinder; first and second main chambers; and a throttling member for allowing and influencing a fluid flow between the first and second main chambers within the damper when the cylinder attachment portion and the piston attachment portion move relative to each other.

22 Claims, 4 Drawing Sheets

(56) References Cited

U.S. PATENT DOCUMENTS

| | | | |
|---|---|---|---|
| 6,119,830 A | | 9/2000 | Richardson et al. |
| 6,918,473 B2 | | 7/2005 | Deferme |
| 7,066,310 B2 | * | 6/2006 | Mintgen et al. ......... 188/322.22 |
| 7,255,211 B2 | * | 8/2007 | Gotz .................. B60G 17/0528 188/280 |
| 7,958,981 B2 | * | 6/2011 | Teraoka ................ F16F 9/5126 188/298 |
| 9,033,121 B2 | | 5/2015 | Kazmirski et al. |
| 2011/0056783 A1 | * | 3/2011 | Teraoka et al. ............... 188/313 |
| 2012/0234639 A1 | * | 9/2012 | Teraoka et al. ............... 188/280 |

FOREIGN PATENT DOCUMENTS

| | | | |
|---|---|---|---|
| CN | 102165214 | | 8/2011 |
| DE | 102011102537 A1 | * | 2/2012 |
| EP | 1826454 A2 | * | 8/2007 |
| EP | 2017494 | | 1/2009 |
| EP | 2128484 A1 | * | 12/2009 |
| GB | 1067966 | * | 5/1967 |
| WO | 03/040586 A1 | | 5/2003 |
| WO | WO 03081077 A1 | * | 10/2003 |

OTHER PUBLICATIONS

CN search report, dated Mar. 19, 2015; Application No. 2012800541374.

* cited by examiner

FLUID-FILLED, FREQUENCY-DEPENDENT DAMPER

BACKGROUND OF THE INVENTION

Field of the Invention

The present invention relates to a fluid-filled, frequency-dependent damper, comprising a cylinder connected to a cylinder attachment portion; a piston connected to a piston attachment portion, the piston being displaceable in the cylinder; a first main chamber; a second main chamber; and a throttling member constructed and arranged for allowing and influencing a fluid flow between the first and second chambers within the damper when the cylinder attachment portion and the piston attachment portion move away from and/or move towards each other.

Description of the Related Art

Such frequency-dependent dampers are well-known for use in automotive engineering. Their aim is to change the damping characteristics as a function of the frequency. More particularly, the aim is to decrease the shock-absorbing characteristics at relatively high frequencies. An example of such a frequency-dependent damper can be found in U.S. Pat. No. 5,129,488. In this case, a part of the fluid moves from the first to the second main chamber via a passage which is (partly) closed by an auxiliary piston during a prolonged movement of the piston rod, as a result of which the damping resistance increases. Such dampers are not capable of achieving other frequency-dependent characteristics which are demanded in certain technical fields. An example thereof are railway applications, in which the damping between the undercarriage of a railway carriage and the upper carriage part mounted on the undercarriage is important for the stability of the carriage during travel of the train. In this case, little damping action is required at low frequencies, while a stiffer damper is required at relatively high frequencies. In addition, there are other technical applications which require a different frequency-dependent characteristic from that described in U.S. Pat. No. 5,129,488. The fluid can be a liquid like, for instance, oil.

BRIEF SUMMARY OF THE INVENTION

It is an object of the present invention to provide a frequency-dependent damper which makes it possible to achieve such modified damping characteristics.

This object is achieved with a fluid-filled, frequency-dependent damper comprising a cylinder connected to a cylinder attachment portion; a piston connected to a piston attachment portion, the piston being displaceable in the cylinder; a first main chamber; a second main chamber; and a throttling member constructed and arranged for allowing and influencing a fluid flow between the first and second main chambers within the damper when the cylinder attachment portion and the piston attachment portion move away from and/or move towards each other, the throttling member comprising an auxiliary cylinder and an auxiliary piston provided in the auxiliary cylinder, the auxiliary piston dividing the auxiliary cylinder in a first auxiliary chamber comprising a first opening providing a fluid connection of the first auxiliary chamber with one of the first and second main chambers, the first opening being closable by a first part of the auxiliary piston, and a second opening providing a fluid connection of the first auxiliary chamber with the other one of the first and second main chambers; and a second auxiliary chamber in fluid connection with the other one of the first and second main chambers via a throttling passage, wherein the first opening is closed by the auxiliary piston in a rest position and is opened by movement of the auxiliary piston in the auxiliary cylinder.

According to the present invention, a fluid connection is opened by displacing the auxiliary piston, thus reducing the throttling action of the throttling member and, accordingly, the damping action. As a result, a characteristic is created in which, at high frequencies (and low amplitude), the damper is relatively stiff, while the damper is relatively soft at low frequencies.

According to a particular embodiment of the present invention, the above-described damper characteristic can be influenced further by the auxiliary piston having a step-like configuration comprising the first part with a first cross-section adapted for closing the opening and a second part having a second cross-section adapted for dividing the auxiliary cylinder in the first and second auxiliary chambers, the second cross-section being larger than the first cross-section. According to this embodiment of the present invention, the part with the relatively small bore is subjected to the fluid pressure from the one the first and second main chambers and the part with the relatively large cross-section is subjected to the fluid pressure from the other one of the first and second main chambers.

In an embodiment the throttling passage is provided in the auxiliary piston between the first and second auxiliary chambers. In another embodiment the throttling passage is provided in a wall of the auxiliary cylinder which bounds the second auxiliary chamber and is in fluid connection with the other one of the first and second main chambers. The position of the throttling passage can be chosen dependent on the application, for instance, to provide a fluid flow such that venting is provided and/or dirt accumulation is prevented.

Although it is possible to move the auxiliary piston into the rest position in any desired way, such as by hydraulic pressure, it is preferred, according to an advantageous embodiment of the present invention, that the damper comprises a spring configured and arranged for biasing the auxiliary piston towards the first opening by spring action of the spring.

According to a further advantageous embodiment of the present invention, an auxiliary non-return valve is provided between the second auxiliary chamber and the other one of the first and second main chambers and is configured and arranged for allowing fluid to fill the second auxiliary chamber from the other one of the first and second main chambers. Such auxiliary non-return valve allows the auxiliary piston to be moved back into the rest position. As a result thereof, it is possible to drive the auxiliary piston back into the rest position at relatively high speed under the effect of the spring pressure or another driving force and this movement does not depend on the throttling connection to the second auxiliary chamber.

In an efficient embodiment the throttling passage is provided as an opening in the auxiliary non-return valve, which provides an efficient combination of functions in certain applications.

In an embodiment the auxiliary non-return valve is arranged between the first and second auxiliary chambers in the auxiliary piston, the auxiliary non-return valve being configured and arranged for allowing fluid to fill the second auxiliary chamber from the first auxiliary chamber. In another embodiment the auxiliary non-return valve is arranged in a wall of the auxiliary cylinder which bounds the second auxiliary chamber and is in fluid connection with the other one of the first and second main chambers. The position of the non-return valve, optionally in combination with the position throttling passage, can be chosen dependent on the application, for instance, to provide a fluid flow such that venting is provided and/or dirt accumulation is prevented.

The above-described throttling member can both be fitted on the piston and be configured as a bottom valve of the cylinder. In both cases, a number of such throttling members may be present, if desired. A throttling member on the piston is preferably used in order to influence the outward stroke of the damper. If it is important to influence the inward stroke, the throttling member may be configured as a bottom valve. It goes without saying that combinations thereof are possible. It will be understood that, in addition to this throttling member, further connecting passages between the two chambers or, if applicable, between one of the chambers and a separate fluid tank may be present.

In an embodiment the throttling member is arranged on the piston that divides the cylinder in a first cylinder chamber as the first main chamber and a second cylinder chamber as the second main chamber, the first cylinder chamber arranged at a piston attachment portion side of the piston and the second cylinder chamber arranged at a cylinder attachment portion side of the piston.

According to a particular embodiment of the present invention, when the throttling member is arranged on the piston, a piston passage is provided, of which one end is connected to the first cylinder chamber and another end is connected to the opening of the first auxiliary chamber such as to provide a fluid connection of the first auxiliary chamber with the first cylinder chamber. Advantageously, a piston rod is arranged between the piston and the piston attachment portion, the piston passage being provided in the piston rod. To allow fluid flow back the piston preferably comprises a non-return valve arranged between the first and second cylinder chambers, the non-return valve being configured and arranged for allowing fluid to flow from the other one of the first and second cylinder chambers to the one of the first and second cylinder chambers.

In an embodiment the piston divides the cylinder in a first cylinder chamber and a second cylinder chamber, and the damper comprises an additional chamber, the throttling member being arranged between a cylinder chamber of the first and second cylinder chambers as the first main chamber and the additional chamber as the second main chamber.

In an embodiment the first cylinder chamber is arranged at a piston attachment portion side of the piston and the second cylinder chamber is arranged at a cylinder attachment portion side of the piston, the throttling member being arranged between the second cylinder chamber and the additional chamber as a bottom valve in the cylinder.

According to a particular embodiment, when the throttling member is arranged as a bottom valve, the first opening of the first auxiliary chamber of the throttling member is connected to the second cylinder chamber. To allow a return flow an additional non-return valve is arranged between the cylinder chamber and the additional chamber, the additional non-return valve being configured and arranged for allowing fluid to flow from the other one of the cylinder chamber and the additional chamber to the one of the cylinder chamber and the additional chamber.

As indicated above, the damper is used in particular with trains. An embodiment of the invention is therefore a train comprising a damper according to the invention. In a specific embodiment the train comprises two mutually coupled carriages, wherein the damper is arranged between the carriages. In another specific embodiment the train comprises a swiveling undercarriage supporting at least one upper carriage part, wherein the damper is arranged between the undercarriage and the upper carriage part. More particularly, the present invention is used with trains which can travel at relatively high speeds, such as a speed of more than 200 km/h.

BRIEF DESCRIPTION OF THE DRAWINGS

The invention will be discussed below with reference to exemplary embodiments illustrated in the drawing, in which same reference numerals denote similar or like parts, and in which.

DETAILED DESCRIPTION OF THE PREFERRED EMBODIMENTS

Figure 1:
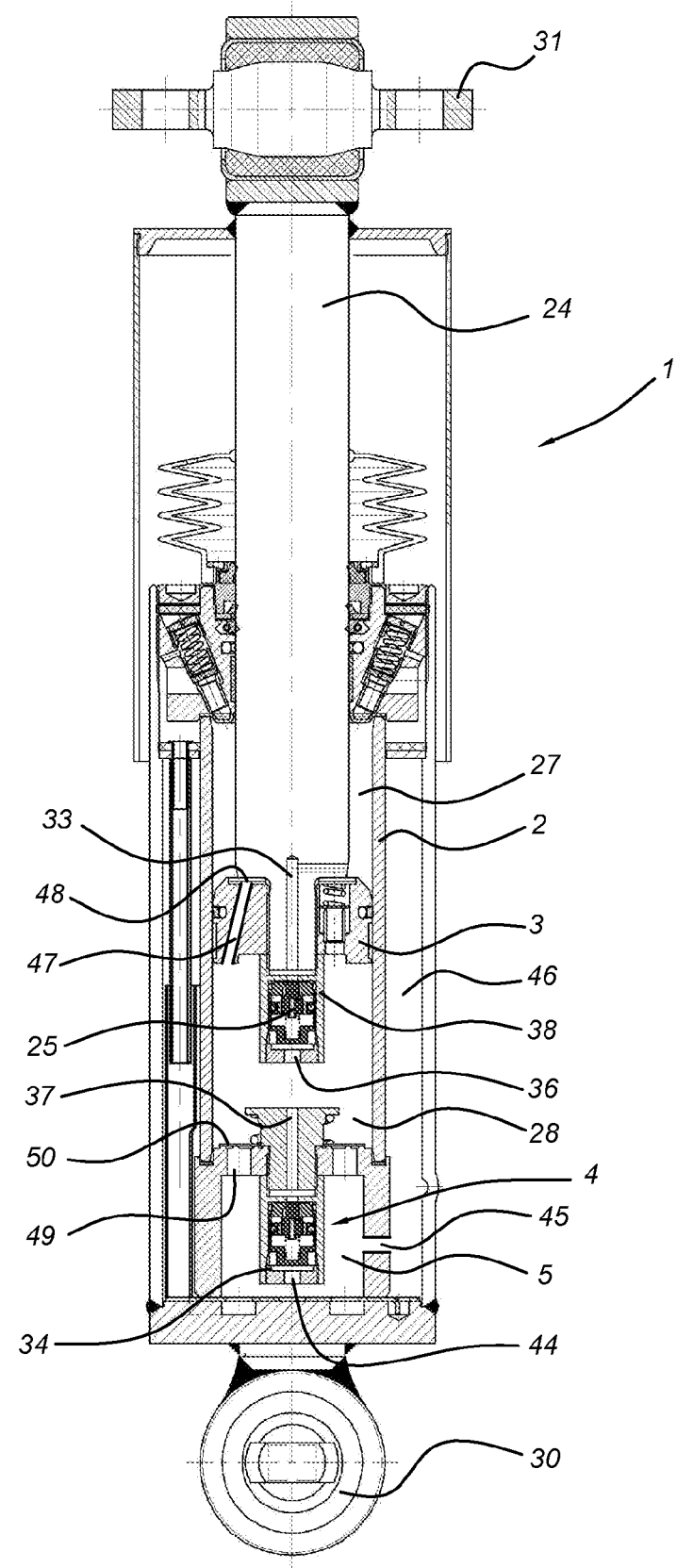
FIG. 1 diagrammatically shows the construction of the damper according to the invention.

FIG. 1 shows a damper 1, in the present example a railway damper. It consists of a cylinder 2 which is provided with a cylinder attachment portion 30 and a piston 3 which is connected to an opposite piston attachment portion 31 by means of a piston rod 24. The piston 3 divides the cylinder 2 into a first cylinder chamber 27 and a second cylinder chamber 28. Passages are present which are known per se in the prior art, such as duct 47 with non-return valve 48 in the piston which make it possible for the piston to move with respect to the cylinder. In addition, a throttling member 25 which is configured in accordance with the invention is present in the piston. It is fitted between the passage 33 which opens into the first cylinder chamber 27 acting as a first main chamber in relation to throttling member 25, and the opening 36 which opens into the second cylinder chamber 28 acting as a second main chamber in relation to throttling member 25. This connection is brought about in a manner which is to be described below by reference of FIG. 2.

Another throttling member 34 is present as a bottom valve in cylinder 2. By means of duct 37, a connection to the second cylinder chamber 28 is provided, while a connection to additional chamber 5 is provided through opening 44. A connection of additional chamber 5 to the fluid tank 46 is provided by means of duct 45. Such a tank serves to hold fluid or to remove it therefrom, which fluid is moved by the piston rod 24 in the cylinder being moved. In case the fluid employed is a liquid, tank 46 may comprise both the liquid and a gas like, for instance, air. The air will become compressed when additional liquid flows into the tank. Second cylinder chamber 28 acts as a first main chamber in relation to throttling member 34, and additional chamber 5 (and fluid tank 46) act as a second main chamber in relation to throttling member 34. A duct 49 and non-return valve 50 are present in the bottom of cylinder 2 to allow fluid to flow from additional chamber 5 to second cylinder chamber 28 if an appropriate pressure difference between both chambers is present.

The principle of the throttling members 25, 34 will be explained by reference to FIG. 2. The throttling members 25 and 34 substantially work in the same way and are configured accordingly.

Figure 2:
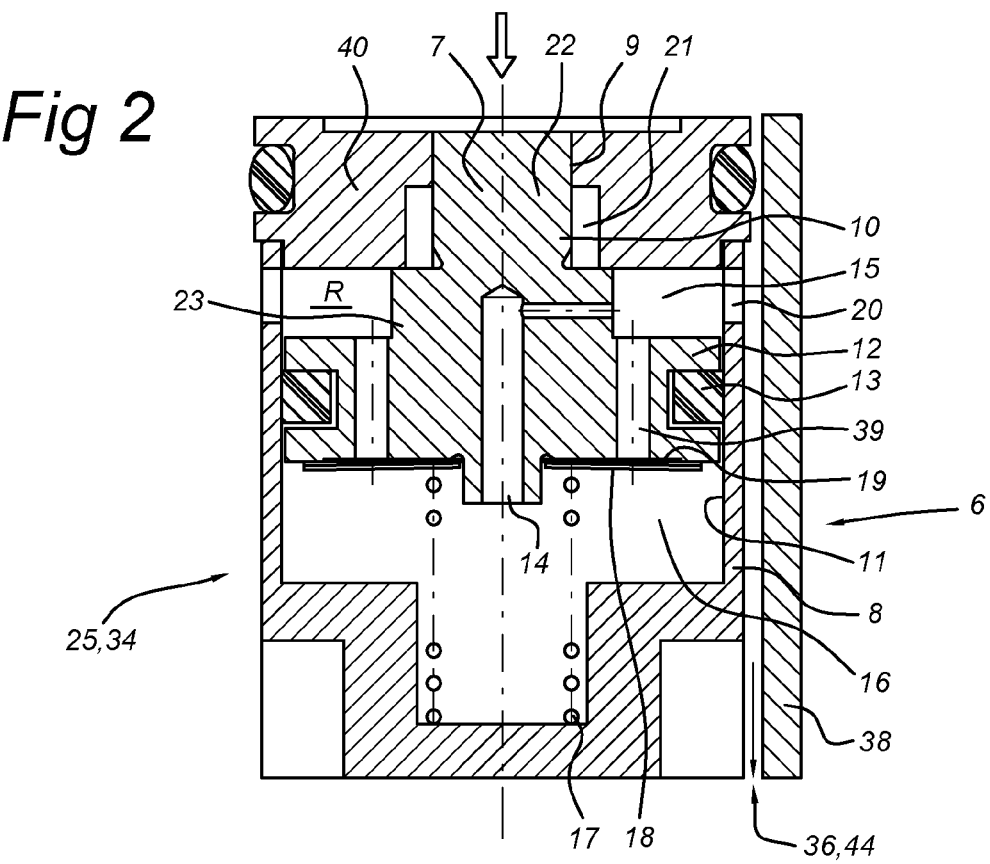
FIG. 2 shows the throttling member according to the invention in the rest position.

As is clear from FIG. 2 and further, the throttling member 25, 34 comprises an auxiliary piston/cylinder assembly which is denoted overall by reference numeral 6 and is accommodated in a sleeve 38 (see also FIG. 1). The sleeve 38 has slots (not visible) which make it possible to connect the openings 20 in the auxiliary cylinder 8 to the opening 36, 44 which opens into the second main chamber. The auxiliary cylinder 8 contains the auxiliary piston 7 which delimits the first auxiliary chamber 15 and the second auxiliary chamber 16. Auxiliary piston 7 is provided with a seal 13. A throttling passage (or control bore) 14 extends through the auxiliary piston and connects the second auxiliary chamber 16 to the first auxiliary chamber 15. In this embodiment, the bore is constantly open, but has a relatively small cross section. In addition, connecting passages 39 are present which connect the first auxiliary chamber 15 to the second auxiliary chamber 16 via a non-return valve 18 which only allows a flow in the direction from the first auxiliary chamber 15 to the second auxiliary chamber 16. A spring 17 is present which forces the auxiliary piston 7 into the rest position, as is illustrated in FIG. 2. The auxiliary piston 7 has an upper part 10 of a relatively small circular size which is accommodated in a correspondingly small bore 9 of the sealing part 40 of the auxiliary cylinder 8. The part 12 with the relatively large diameter is accommodated in the part of the auxiliary cylinder 8 with the relatively large diameter in the above-described manner.

Figure 3:
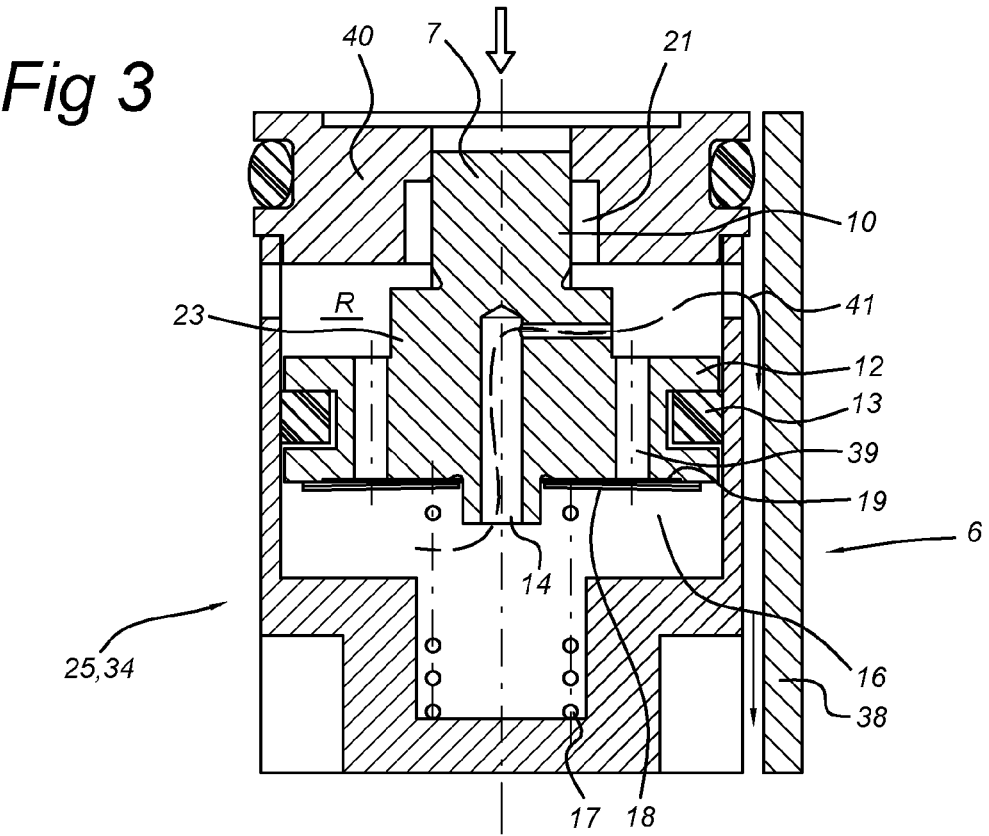
FIG. 3 shows the throttling member according to the present invention in a first damping position.

The operation of damper will be described by reference to throttling member 25, while throttling member 34 operates in an equivalent manner. When the parts 30 and 31 move apart, the pressure in the first cylinder chamber 27, acting as first main chamber in relation to throttling member 25, will increase. This increased pressure is applied to the free end of the auxiliary piston 7 via piston passage 33. This free end of first part 10 has a relatively small diameter. As described above, the other part of the auxiliary piston has a relatively larger diameter. By choosing the ratio of the diameter of first part 10 to the diameter of second part 12 in combination with the strength of the spring and the size of the throttling passage 14, it is possible to adjust the sensitivity of the displacement of the auxiliary piston with respect to the auxiliary cylinder. As is indicated in FIG. 2, a force is applied to first part 10 of the auxiliary piston in the manner described above. If this force is greater than the force caused by a lower pressure in the second main chamber 28 acting on the relatively larger surface of second part 12 and increased by the pressure generated by the spring 17, the auxiliary piston will move in a direction to enlarge the volume of first auxiliary chamber and to reduce the volume of the second auxiliary chamber. However, this movement is throttled by the throttling passage 14. During this movement, the non-return valves 18 are closed, so that fluid can only be moved to the first auxiliary chamber 15 through the throttling passage 14 from the second auxiliary chamber. Fluid in the first auxiliary chamber 15 can be discharged to the second main chamber via the opening 20 and the passages, such as grooves, provided between the sleeve 38 and the auxiliary cylinder. This is illustrated diagrammatically in FIG. 3, with arrow 41 indicating the flow of fluid.

Figure 4:
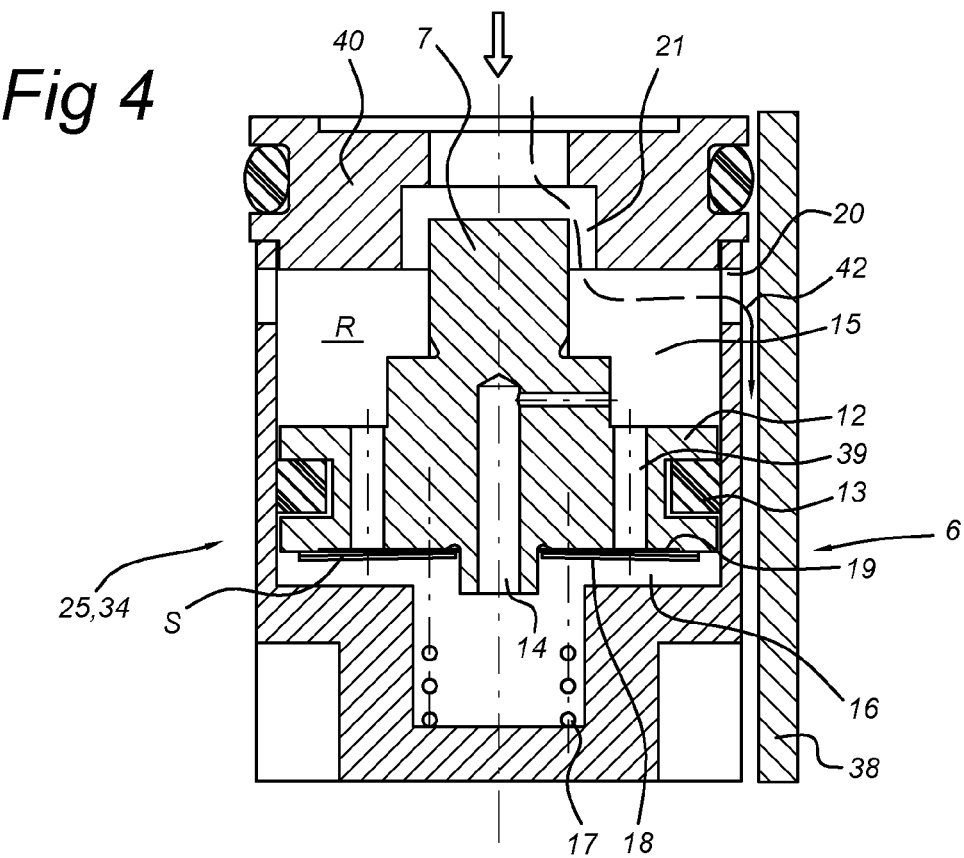
FIG. 4 shows the throttling member in a further position in which the damping characteristic of the damper is influenced.

If the movement continues, the upper side of the first part 10 of auxiliary piston 7 will, at a certain point in time, be released from the relatively small bore 9. Depending on the size of the opening 20 relative to the diameter of the auxiliary piston 7, the full pressure may at that moment be applied to the (in the figure) upper part of the second part 12 of the auxiliary piston having the relatively larger diameter, either gradually or in the form of an impact. As a result thereof, the auxiliary piston will open far quickly in a very short time, leading to the situation as illustrated in FIG. 4. In this situation, damping fluid can readily be discharged from the first main chamber through the piston passage 33 (FIG. 1) to the second main chamber via opening 20, as indicated by arrow 42. If the movement comes to a rest or even if it is reversed, there will no longer be a pressure difference in the abovementioned sense between the first and second main chamber. As a result thereof, the force of the spring 17 will force the auxiliary piston 7 back in the direction of the bore 9 which has a relatively small diameter. In this case, the force of the spring 17 is preferably so high and the throttling effect of the throttling passage 14 is so large that an underpressure is created in the second auxiliary chamber which is such that the non-return valve 18, which is configured as an annular valve in this example, opens, as a result of which it is ensured that fluid flows through channels 39 so that the auxiliary piston makes a quick return movement and rapidly closes bore 9 that has a relatively small diameter.

Figure 5:
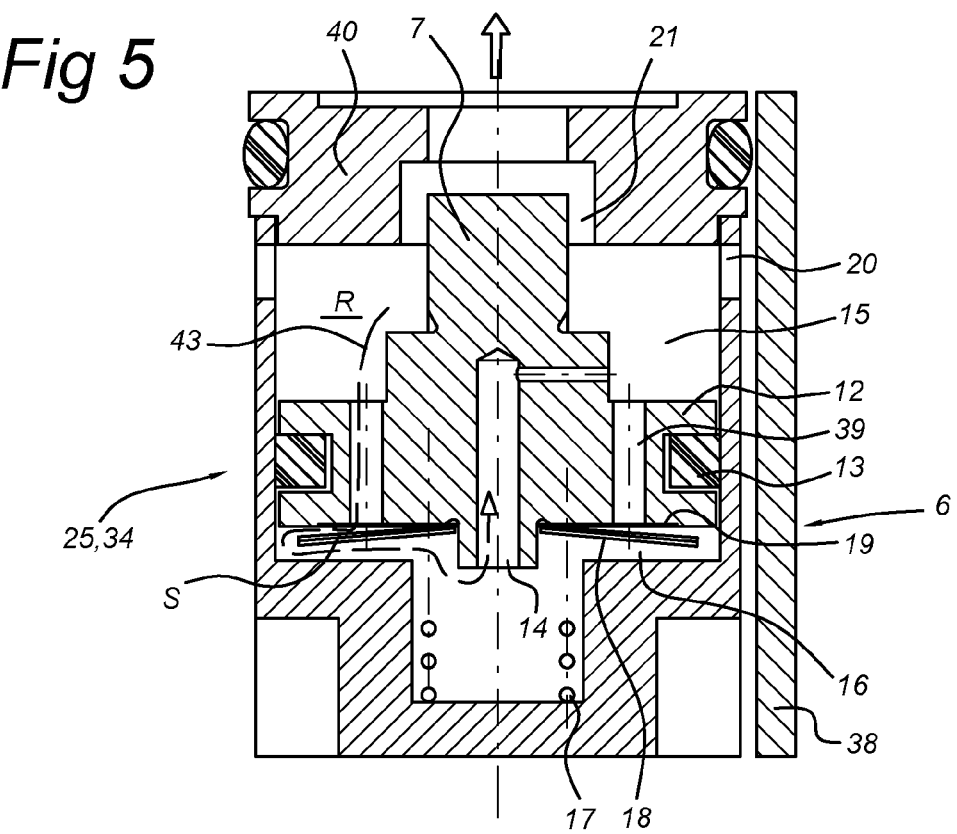
FIG. 5 shows the situation during the return movement of the damper.

It will be understood that numerous intermediate variants exist, depending on the movement of attachment portions 30 and 31 with respect to one another. If first part 10 is not yet in the bore 9 during the return movement, as illustrated in FIG. 5, relatively little overpressure is needed between the first main chamber 27 (or 28) and the second main chamber 28 (or 5) to maintain the above-described "soft" damping. In addition, the return movement of the auxiliary piston as shown in FIG. 5 will depend on the pressure prevailing in the first auxiliary chamber 15, which in turn depends on the movement of the fastening means 30 and 31 with respect to one another.

Figure 6:
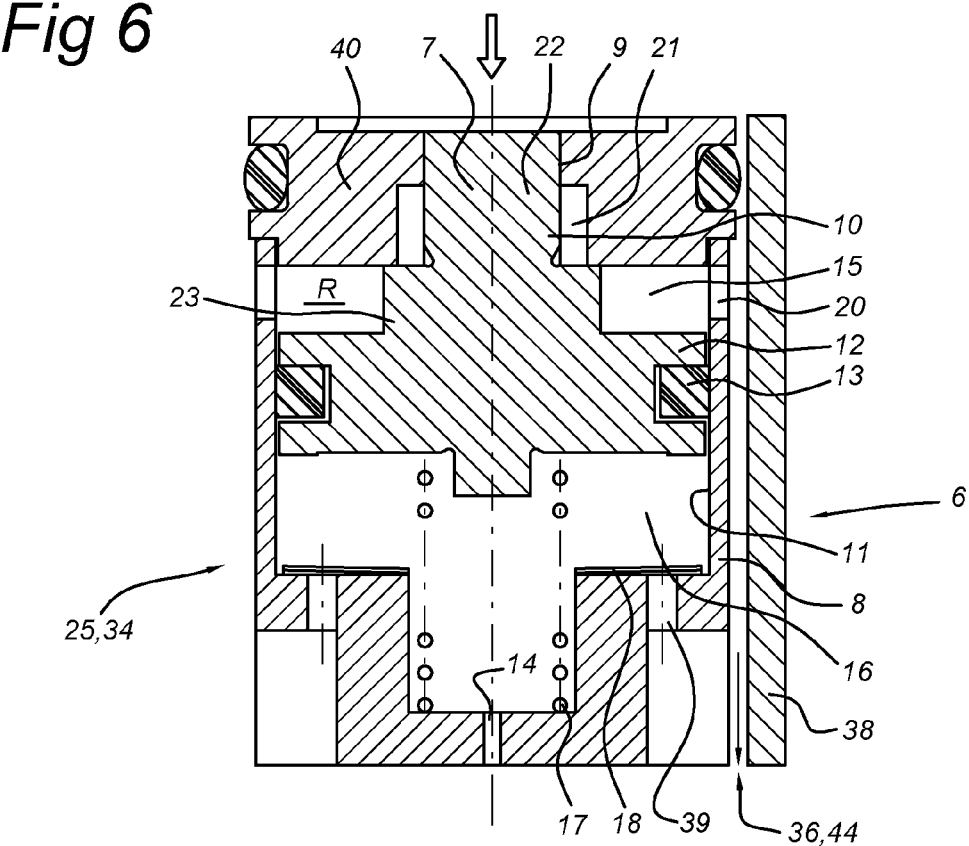
FIG. 6 is equivalent to FIG. 2, but shows a variant of the throttling member.

One variant of the throttling member 25, 34 is shown in FIG. 6, which shows the throttling passage 14 at the underside of second auxiliary chamber 16 opposite auxiliary piston to open in the second main chamber directly or through opening 36, 44. The throttling passage 14 may also be provided in a side wall of second auxiliary chamber 16. In general, the throttling passage 14 allows fluid to flow out of auxiliary chamber 16 to the second main chamber when the volume of the second auxiliary chamber is reduced.

FIG. 6 further shows a variant in the position of non-return valve 18. Channel 39 is provided in a wall of second auxiliary chamber, just as the throttling passage 14, and also opens in the second main chamber directly or through opening 36, 44. The non-return valve 18 closes channel 39 and opens when an underpressure is present in the second auxiliary chamber to allow fluid flow from the second main chamber into the second auxiliary chamber. The non-return valve 18 of FIG. 6 can be held in position by any known means. For instance, spring 17 can be provided in a conical shape (as opposed to a cylindrical shape as shown in FIG. 6) having its bottom side resting on the end of the non-return valve 18 turned away from the channel 39. Such bottom end of spring 17 has a larger diameter than shown in FIG. 6. The diameter at the top end will be the same as shown in FIG. 6. A separate spring holding the non-return valve 18 in place can be provided as well, just as any other mechanical fixing means.

Another variation is indicated in FIGS. 4 and 5, which show a non-return valve 18 having an opening S that functions as a throttling passage 14. The opening S is configured as a slit. The various options for the throttling passages 14 may be used alone or in combination.

It will be understood that the above-described throttling member can also be used in reverse, that is to say configured and arranged such that it becomes operational when the attachment portions 30 and 31 move towards one another.

Figure 7:
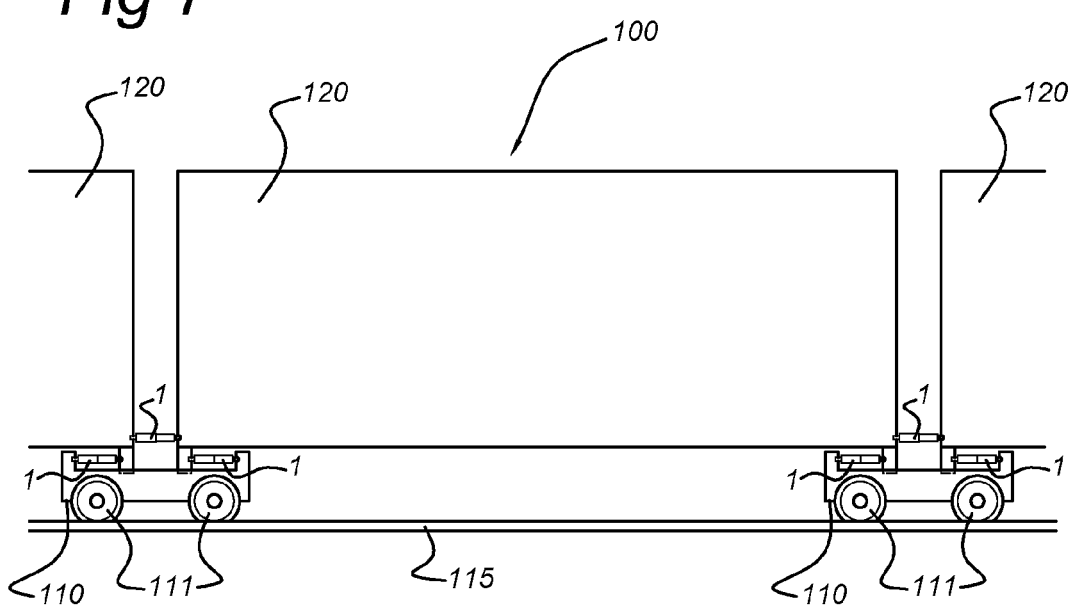
FIG. 7 shows a train comprising a damper according to the invention.

FIG. 7 shows a train 100 having undercarriages 110 with wheels 111 for rolling on a track 115. Upper carriage parts 120 are mounted on the undercarriages. The dampers 1 according to the invention are shown mounted in between carriages, as so-called body-to-body dampers, and in between undercarriage 110 and an upper carriage part 120, as so-called yaw dampers. Dampers 1 are shown in both positions in between carriages and in between undercarriage and upper part, but need not be provided in both positions. Body-to-body dampers and yaw dampers can either be used alone or in combination.

After reading the above, those skilled in the art will immediately be able to think of variants which are within the scope of the attached claims. In addition, rights are expressly sought for the subject-matter of the dependent claims, separate from claim 1.

The invention claimed is:

1. A fluid-filled, frequency-dependent damper (1) comprising:
   a cylinder (2) connected to a cylinder attachment portion (30);
   a piston (3) connected to a piston attachment portion (31), the piston being displaceable in the cylinder;
   a first main chamber (27; 28);
   a second main chamber (28; 5); and
   a throttling member (25; 34) constructed and arranged for allowing and influencing a fluid flow between the first and second main chambers within the damper when the cylinder attachment portion and the piston attachment portion move away from and/or move towards each other,
   the throttling member (25; 34) comprising an auxiliary cylinder (8) and an auxiliary piston (7) provided in the auxiliary cylinder, the auxiliary piston dividing the auxiliary cylinder (8) into a first auxiliary chamber (15) and a second auxiliary chamber (16),
   the first auxiliary chamber (15) comprising
   a first opening (9) providing a fluid connection of the first auxiliary chamber with one of the first and second main chambers (27, 28), the first opening being closable by a first part (10) of the auxiliary piston (7), and
   a second opening (20) providing an always-open fluid connection between i) the first auxiliary chamber and ii) the other one of the first and second main chambers; and
   the second auxiliary chamber (16) being in fluid connection with the other one of the first and second main chambers via a throttling passage (14),
   wherein the first opening (9) is closed by that the first part of the auxiliary piston in a rest position and is opened by movement of the auxiliary piston in the auxiliary cylinder and a direct fluid connection is provided between the first and second main chambers when the first opening is not closed by the first part of the auxiliary piston to thereby provide a characteristic of the damper being relative stiff at higher frequencies and relatively soft at lower frequencies.

2. The damper according to claim 1, wherein the throttling member (25) is arranged on the piston (3) that divides the cylinder in a first cylinder chamber (27) as the first main chamber and a second cylinder chamber (28) as the second main chamber, the first cylinder chamber arranged at a piston attachment portion side of the piston and the second cylinder chamber arranged at a cylinder attachment portion side of the piston.

3. The damper according to claim 2, wherein a piston passage (33) is provided, of which one end is connected to the first cylinder chamber and another end is connected to the opening (9) of the first auxiliary chamber (15) such as to provide a fluid connection of the first auxiliary chamber with the first cylinder chamber.

4. The damper according to claim 3, wherein a piston rod (24) is arranged between the piston (3) and the piston attachment portion (31), the piston passage being provided in the piston rod.

5. The damper according to claim 2, wherein the piston (3) comprises a non-return valve (48) arranged between the first and second cylinder chambers (27, 28), the non-return valve being configured and arranged for allowing fluid to flow from the other one of the first and second cylinder chambers to the one of the first and second cylinder chambers.

6. The damper according to claim 5, wherein the piston only comprises the throttling member for fluid flow from the first cylinder chamber to the second cylinder chamber, and the piston only comprises the non-return valve (48) for fluid flow from the second cylinder chamber to the first cylinder chamber.

7. The damper according to claim 1, wherein the piston (3) divides the cylinder in a first cylinder chamber (27) and a second cylinder chamber (28), and the damper comprises an additional chamber (5), the throttling member being arranged between a cylinder chamber of the first (27) and second (28) cylinder chambers as the first main chamber and the additional chamber (5) as the second main chamber.

8. The damper according to claim 7, wherein the first cylinder chamber (27) is arranged at a piston attachment portion side of the piston (3) and the second cylinder chamber (28) is arranged at a cylinder attachment portion side of the piston (3), the throttling member (34) being arranged between the second cylinder chamber (28) and the additional chamber (5) as a bottom valve in the cylinder (2).

9. The damper according to claim 8, wherein the first opening (9) of the first auxiliary chamber (15) of the throttling member (34) is connected to the second cylinder chamber (28).

10. The damper according to claim 7, wherein an additional non-return valve (50) is arranged between the cylinder chamber (27; 28) and the additional chamber (5), the additional non-return valve being configured and arranged for allowing fluid to flow from the other one of the cylinder chamber and the additional chamber to the one of the cylinder chamber and the additional chamber.

11. The damper according to claim 1, wherein an auxiliary non-return valve (18) is provided between the second auxiliary chamber (16) and the other one of the first and second main chambers and is configured and arranged for allowing fluid to fill the second auxiliary chamber (16) from the other one of the first and second main chambers.

12. The damper according to claim 11, wherein the throttling passage (14) is provided as an opening in the auxiliary non-return valve (18).

13. The damper according to claim 11, wherein the auxiliary non-return valve (18) is arranged between the first and second auxiliary chambers (15, 16) in the auxiliary piston (7), the auxiliary non-return valve being configured and arranged for allowing fluid to fill the second auxiliary chamber (16) from the first auxiliary chamber (15).

14. The damper according to claim 11, wherein the auxiliary non-return valve (18) is arranged in a wall of the auxiliary cylinder (8) which bounds the second auxiliary chamber (16) and is in fluid connection with the other one of the first and second main chambers.

15. The damper according to claim 1, wherein the auxiliary piston (7) has a step-like configuration comprising the first part (10) with a first cross-section adapted for closing the opening (9) and a second part (12) having a second cross-section adapted for dividing the auxiliary cylinder (8) in the first (15) and second (16) auxiliary chambers, the second cross-section being larger than the first cross-section.

16. The damper according to claim 15, wherein the opening (9) is bore-shaped and the first part (10) is circular-shaped for accommodation in the corresponding bore-shaped opening to allow continued movement of the first part in the bore-shaped opening until release of the first part from the bore-shaped opening (9) for opening thereof.

17. The damper according to claim 1, wherein the throttling passage (14) is provided in the auxiliary piston (7) between the first (15) and second (16) auxiliary chambers.

18. The damper according to claim 1, wherein the throttling passage (14) is provided in a wall of the auxiliary cylinder (8) which bounds the second auxiliary chamber (16) and is in fluid connection with the other one of the first and second main chambers.

19. The damper according to claim 1, wherein the damper comprises a spring (17) configured and arranged for biasing the auxiliary piston (7) towards the first opening (9) by spring action of the spring.

20. Train comprising the damper according to claim 1, further comprising two mutually coupled carriages (120), wherein the damper (1) is arranged between the carriages.

21. Train comprising the damper according to claim 1, further comprising a swivelling undercarriage (110) supporting at least one upper carriage part (120), wherein the damper (1) is arranged between the undercarriage and the upper carriage part.

22. The damper according to claim 1, wherein the second opening (20) provides a bi-directional always-open fluid connection between i) the first auxiliary chamber and ii) the other one of the first and second main chambers.

* * * * *